United States Patent
Yeh et al.

(10) Patent No.: US 11,600,117 B2
(45) Date of Patent: Mar. 7, 2023

(54) GESTURE RECOGNITION SYSTEM AND GESTURE RECOGNITION METHOD

(71) Applicant: Egis Technology Inc., Hsinchu (TW)

(72) Inventors: Chao-Yi Yeh, Hsinchu (TW); Kuan-Yi Lin, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/761,211

(22) PCT Filed: Oct. 29, 2020

(86) PCT No.: PCT/CN2020/124920
§ 371 (c)(1),
(2) Date: Mar. 17, 2022

(87) PCT Pub. No.: WO2021/129134
PCT Pub. Date: Jul. 1, 2021

(65) Prior Publication Data
US 2022/0343688 A1    Oct. 27, 2022

Related U.S. Application Data

(60) Provisional application No. 63/028,575, filed on May 22, 2020, provisional application No. 62/954,676, (Continued)

(51) Int. Cl.
*G06V 40/20* (2022.01)
*G06V 40/13* (2022.01)
*G06F 3/042* (2006.01)

(52) U.S. Cl.
CPC .............. *G06V 40/28* (2022.01); *G06F 3/042* (2013.01); *G06V 40/1318* (2022.01)

(58) Field of Classification Search
CPC .............. G06V 40/28; G06V 40/1318; G06V 40/1335; G06V 40/1347; G06V 40/1365;
(Continued)

(56) References Cited

U.S. PATENT DOCUMENTS

2016/0077620 A1* 3/2016 Choi .................. G06F 3/041
345/173
2016/0180145 A1 6/2016 Setterberg et al.
(Continued)

FOREIGN PATENT DOCUMENTS

CN    104331656    2/2015
CN    105528592    4/2016
(Continued)

OTHER PUBLICATIONS

"International Search Report (Form PCT/ISA/210) of PCT/CN2020/124920," dated Jan. 27, 2021, with English translation thereof, pp. 1-4.

*Primary Examiner* — Premal R Patel
(74) *Attorney, Agent, or Firm* — JCIPRNET (57) ABSTRACT

A gesture recognition system and a gesture recognition method are provided. The gesture recognition system includes a fingerprint sensor and a processing circuit. The processing circuit obtains a first fingerprint image and a second fingerprint image through the fingerprint sensor. The processing circuit obtains a plurality of first coordinate parameters of a plurality of first coordinate points in the first fingerprint image, and obtains a plurality of second coordinate parameters of a plurality of second coordinate points in the second fingerprint image. The first coordinate points of the first fingerprint image and the second coordinate points of the second fingerprint image respectively have a plurality of grayscale values corresponding to each other. The processing circuit determines a gesture operation according to the first coordinate parameters and the second coordinate parameters.

13 Claims, 5 Drawing Sheets

Related U.S. Application Data filed on Dec. 30, 2019, provisional application No. 62/953,590, filed on Dec. 26, 2019.

(58) Field of Classification Search
CPC ..... G06V 40/13; G06F 3/042; G06F 3/04883; G06F 21/32; G06F 3/0488
See application file for complete search history.

(56) References Cited

U.S. PATENT DOCUMENTS

| | | | |
|---|---|---|---|
| 2016/0364600 A1* | 12/2016 | Shah | ................... G06F 3/04883 |
| 2016/0372088 A1 | 12/2016 | Dow et al. | |
| 2018/0101715 A1 | 4/2018 | Lee et al. | |
| 2018/0113548 A1 | 4/2018 | Lee et al. | |
| 2020/0302146 A1* | 9/2020 | Bjerre | ................... G06F 3/0487 |

FOREIGN PATENT DOCUMENTS

| | | |
|---|---|---|
| CN | 105630325 | 6/2016 |
| CN | 107122760 | 9/2017 |
| CN | 108182046 | 6/2018 |
| CN | 108962159 | 12/2018 |
| TW | 201624348 | 7/2016 |
| TW | I620099 | 4/2018 |
| TW | 201820206 | 6/2018 |

\* cited by examiner

GESTURE RECOGNITION SYSTEM AND GESTURE RECOGNITION METHOD

CROSS-REFERENCE TO RELATED APPLICATION

This application is a 371 application of the International PCT application no. PCT/CN2020/124920, filed on Oct. 29, 2020, which claims the priority benefits of U.S. provisional application Ser. No. 62/953,590, filed on Dec. 26, 2019, U.S. provisional application Ser. No. 62/954,676, filed on Dec. 30, 2019, and U.S. provisional application Ser. No. 63/028,575, filed on May 22, 2020. The entirety of each of the above-mentioned patent applications is hereby incorporated by reference herein and made a part of this specification.

TECHNICAL FIELD

The invention relates to a recognition system, and particularly to a gesture recognition system and a gesture recognition method.

DESCRIPTION OF RELATED ART

For existing touch sensing panels, if a touch sensing panel is further integrated with a fingerprint sensor, it results in an increase in the overall panel thickness due to the sensing unit layer of the fingerprint sensor in addition to the touch panel and display panel of the touch sensing panel. In view of this, solutions of several embodiments will be provided below that may replace a touch sensing function of the touch panel.

SUMMARY

The invention provides a gesture recognition system and a gesture recognition method, in which a gesture of a user can be recognized by comparing fingerprint images of the user.

According to an embodiment of the invention, a gesture recognition system of the invention includes a fingerprint sensor and a processing circuit. The processing circuit is coupled to the fingerprint sensor. The processing circuit is used to obtain a first fingerprint image and a second fingerprint image through the fingerprint sensor. The processing circuit obtains a plurality of first coordinate parameters of a plurality of first coordinate points in the first fingerprint image, and obtains a plurality of second coordinate parameters of a plurality of second coordinate points in the second fingerprint image. The first coordinate points of the first fingerprint image and the second coordinate points of the second fingerprint image respectively have a plurality of grayscale values corresponding to each other. The processing circuit determines a gesture operation according to the first coordinate parameters and the second coordinate parameters.

According to an embodiment of the invention, a gesture recognition method of the invention includes the following steps. A first fingerprint image and a second fingerprint image are obtained. A plurality of first coordinate parameters of a plurality of first coordinate points in the first fingerprint image are obtained, and a plurality of second coordinate parameters of a plurality of second coordinate points in the second fingerprint image are obtained. A gesture operation is determined according to the first coordinate parameters and the second coordinate parameters. The first coordinate points of the first fingerprint image and the second coordinate points of the second fingerprint image respectively have a plurality of grayscale values corresponding to each other.

Based on the foregoing, in the gesture recognition system and the gesture recognition method of the invention, the gesture of the user may be recognized according to the fingerprint position change in the digital fingerprint image of the user.

To make the aforementioned features and advantages of the invention more obvious and comprehensible, several embodiments accompanied with drawings are described in detail as follows.

DESCRIPTION OF THE EMBODIMENTS

Reference will now be made in detail to exemplary embodiments of the invention, examples of which are illustrated in the accompanying drawings. Wherever possible, the same reference numerals are used in the drawings and description to refer to the same or like parts.

Figure 1:
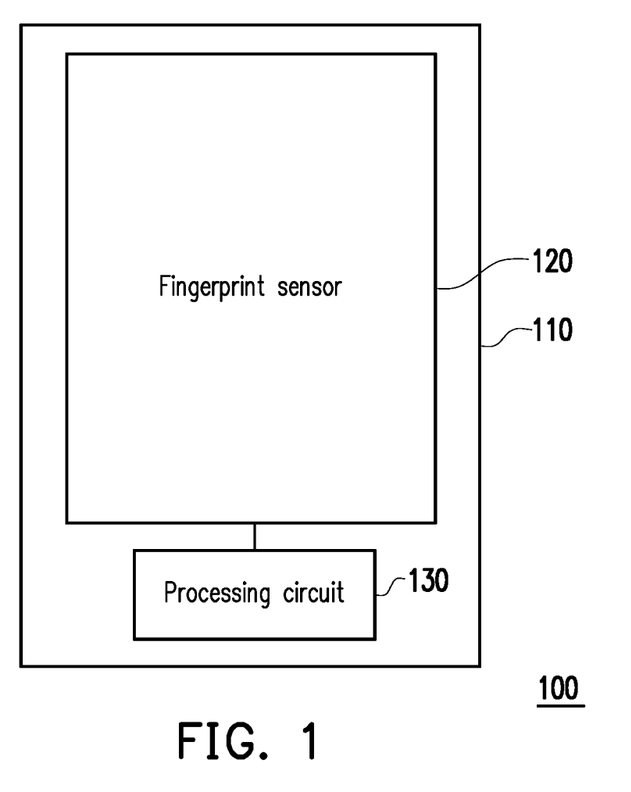
FIG. 1 is a schematic diagram of a gesture recognition system of an embodiment of the invention.

FIG. 1 is a schematic diagram of a gesture recognition system of an embodiment of the invention. With reference to FIG. 1, a gesture recognition system 100 may be an electronic device having a fingerprint sensing function. The electronic device may be, for example, a mobile phone, a tablet computer, a mobile device, a wearable device, and the like. The gesture recognition system 100 includes a panel 110, a fingerprint sensor 120, and a processing circuit 130. The fingerprint sensor 120 is coupled to the processing circuit 130. In this embodiment, the fingerprint sensor 120 may be a full-screen fingerprint sensor, and includes a plurality of thin film transistor image sensing units disposed in a pixel array of the panel 110. The panel 110 may be, for example, a light-emitting diode (LED) display panel, an organic light-emitting diode (OLED) display panel, or other types of display panels. Therefore, the pixel array may be formed, for example, by arranging a plurality of LED pixel units and the array of thin film transistor image sensing units. In other embodiments, the fingerprint sensor 120 may be a large-area optical fingerprint sensor disposed below the panel 110.

Figure 2:
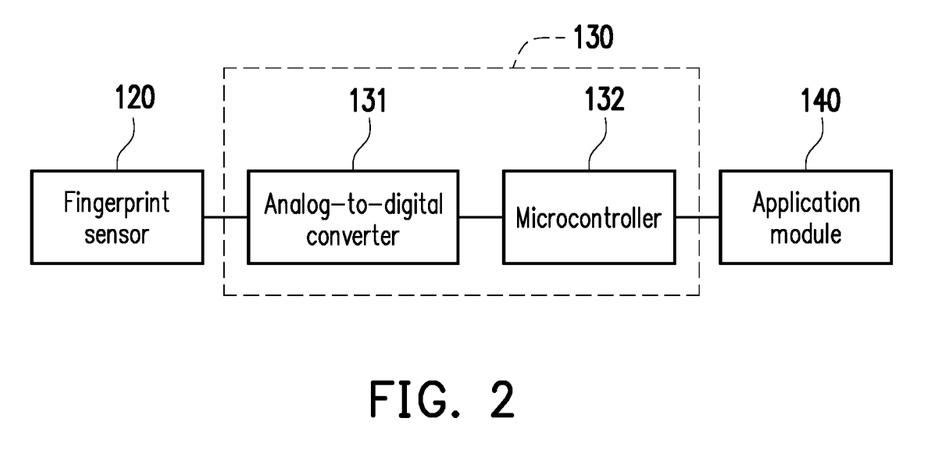
FIG. 2 is a schematic circuit diagram of a gesture recognition system of an embodiment of the invention.

FIG. 2 is a schematic circuit diagram of a gesture recognition system of an embodiment of the invention. With reference to FIG. 1 and FIG. 2, the processing circuit 130 may include an analog-to-digital converter 131 and a microcontroller 132. The analog-to-digital converter 131 is coupled to the fingerprint sensor 120. The microcontroller 132 is coupled to an application module 140. The application module 140 may be, for example, a software program executed by a central processing unit of an electronic device, such as a central processing unit of a mobile phone. In this embodiment, a user may place a finger on the panel 110 for movement, rotation, or sliding rotation, so that the fingerprint sensor 120 may continuously obtain sensing signals of a plurality of fingerprint images of the user, and output the sensing signals to the analog-to-digital converter 131 to generate the fingerprint images. In this embodiment, the microcontroller 132 may analyze the fingerprint position change in the fingerprint images to determine a gesture of the user, and provide corresponding gesture operation information to the application module 140. In this embodiment, the application module 140 may be, for example, application software stored in the electronic device, and the application module 140 may perform corresponding operations according to the gesture operation information.

Figure 3:
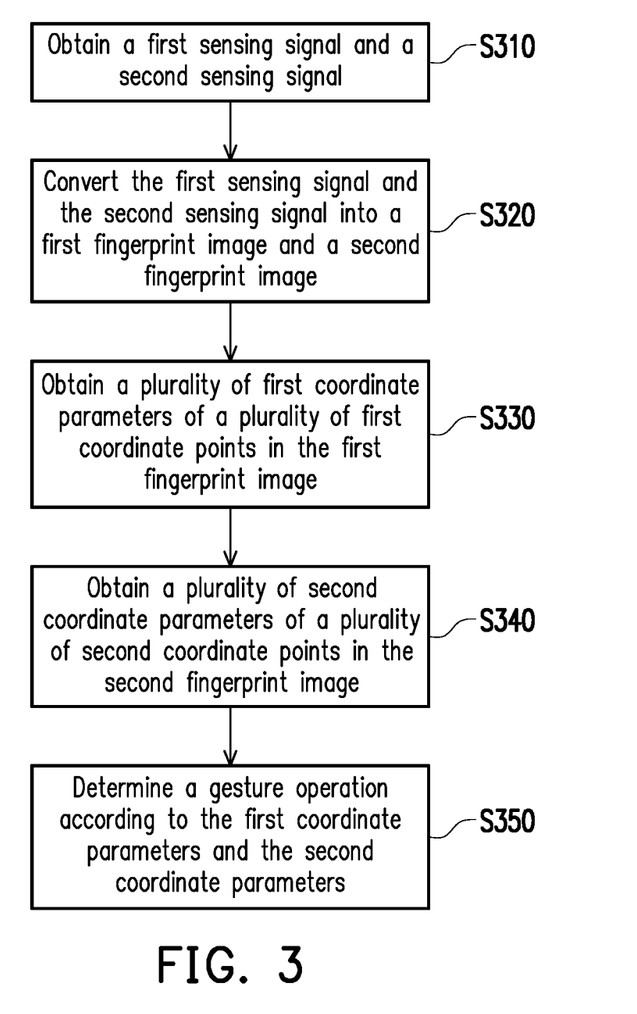
FIG. 3 is a flowchart of a gesture recognition method of an embodiment of the invention.

FIG. 3 is a flowchart of a gesture recognition method of an embodiment of the invention. With reference to FIG. 1 to FIG. 3, the gesture recognition system 100 may perform steps S310 to S350 as shown in FIG. 3. In this embodiment, when the finger of the user is placed or pressed on the panel 110, the fingerprint sensor 120 may continuously sense the fingerprint of the user. Therefore, in step S310, the fingerprint sensor 120 may obtain a first sensing signal and a second sensing signal. The first sensing signal corresponds to, for example, a sensing result of the position of the finger of the user at a first time point, and the second sensing signal corresponds to, for example, a sensing result of the position of the finger of the user at a second time point. The fingerprint sensor 120 outputs the first sensing signal and the second sensing signal to the processing circuit 130. In step S320, the processing circuit 130 may convert the first sensing signal and the second sensing signal into a first fingerprint image and a second fingerprint image. In this embodiment, the analog-to-digital converter 131 of the processing circuit 130 may respectively convert the first sensing signal and the second sensing signal that are analog into a first digital signal and a second digital signal, and then output the first digital signal and the second digital signal to the microcontroller 132, so that the microcontroller 132 may generate the first fingerprint image and the second fingerprint image according to the first digital signal and the second digital signal.

In this embodiment, the microcontroller 132 may analyze a plurality of feature points in the first fingerprint image and the second fingerprint image. In an embodiment, the microcontroller 132 may select the feature points of a plurality of coordinate points having the same grayscale value or a plurality of grayscale values within a grayscale value range (e.g., grayscale values from 200 to 220) to perform the following analysis and determination, but the invention is not limited thereto. Therefore, in step S330, the microcontroller 132 may obtain a plurality of first coordinate parameters of a plurality of first coordinate points in the first fingerprint image. In step S340, the microcontroller 132 may obtain a plurality of second coordinate parameters of a plurality of second coordinate points in the second fingerprint image. In step S350, the microcontroller 132 may determine a gesture operation according to the first coordinate parameters and the second coordinate parameters. In this regard, since the first fingerprint image and the second fingerprint image are mapped to the same fingerprint, the microcontroller 132 of this embodiment may determine the gesture of the finger of the user on the fingerprint sensor 120 according to displacement change, angle change, or both displacement and angle change results of the coordinate parameters corresponding to the same feature point respectively in the first fingerprint image and the second fingerprint image.

It is worth noting that in an embodiment, the microcontroller 132 or the application module 140 may first determine whether the first fingerprint image passes a fingerprint verification. If the first fingerprint image does not pass the fingerprint verification, the microcontroller 132 or the application module 140 does not perform related operations. If the first fingerprint image passes the fingerprint verification, the microcontroller 132 or the application module 140 performs related operations. For example, the application module 140 may be used to perform screen unlocking or screen locking of the electronic device, for example. When the first fingerprint image passes the fingerprint verification, the application module 140 may further decide whether to perform screen unlocking or screen locking according to the determination of the gesture operation, and provide screen unlocking or screen locking operation with good security. Naturally, in the invention, it may also be determined whether the first fingerprint image and the second fingerprint image both pass the fingerprint verification to enhance the security confirmation level.

Figure 4:
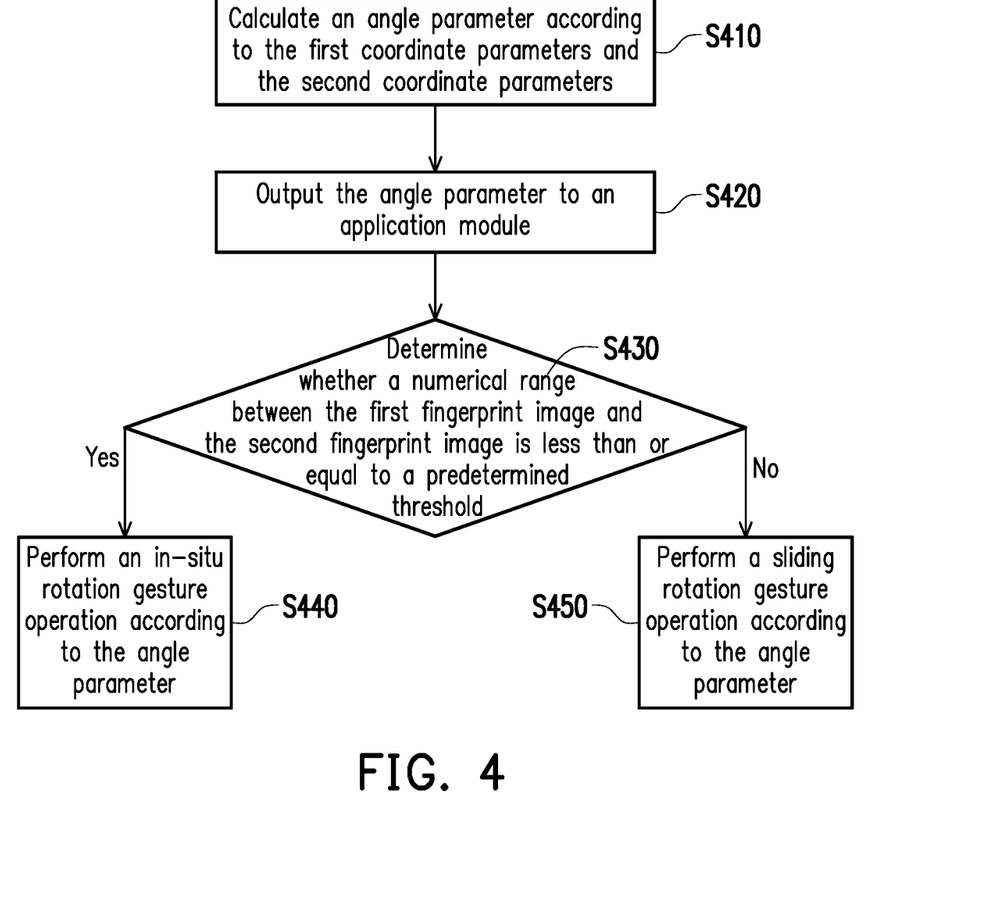
FIG. 4 is a flowchart of recognizing an in-situ rotation gesture and a sliding rotation gesture of an embodiment of the invention.
Figure 5A:
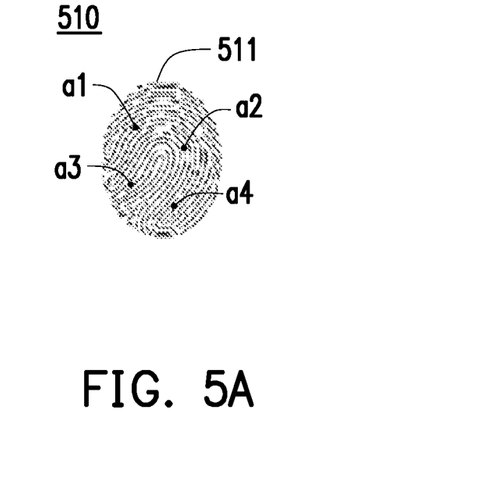
FIG. 5A and FIG. 5B are schematic diagrams of fingerprint images of an in-situ rotation gesture of an embodiment of the invention.
Figure 5B:
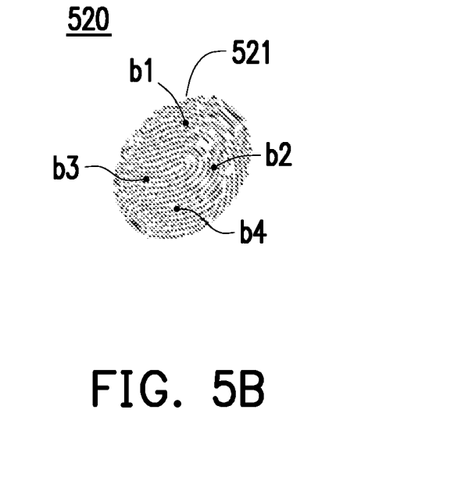
Figure 6:
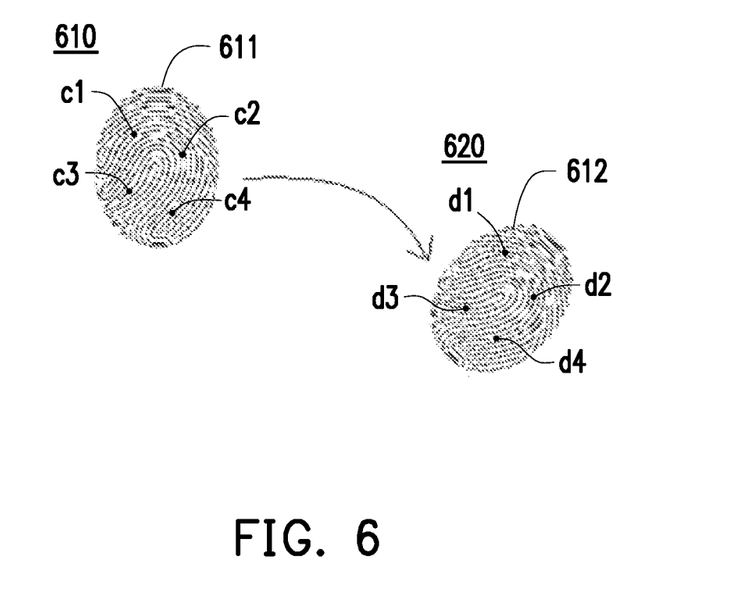
FIG. 6 is a schematic diagram of fingerprint images of a sliding rotation gesture of an embodiment of the invention.

FIG. 4 is a flowchart of recognizing an in-situ rotation gesture and a sliding rotation gesture of an embodiment of the invention. FIG. 5A and FIG. 5B are schematic diagrams of fingerprint images of an in-situ rotation gesture of an embodiment of the invention. FIG. 6 is a schematic diagram of fingerprint images of a sliding rotation gesture of an embodiment of the invention. In this embodiment, the microcontroller 132 may further perform steps S410 to S450 of FIG. 4 to realize the function of recognizing the in-situ rotation gesture and the sliding rotation gesture. Steps S410 to S450 may be further implementation means of step S350 of FIG. 3. First, with reference to FIG. 1 to FIG. 5B, in this embodiment, the microcontroller 132 may obtain a first fingerprint image 510 and a second fingerprint image 520 as shown in FIG. 5A and FIG. 5B. The microcontroller 132 may select a plurality of coordinate points having a plurality of grayscale values within a grayscale value range (e.g., grayscale values from 200 to 220) respectively in the first fingerprint image 510 and the second fingerprint image 520, to obtain, for example, a plurality of first coordinate parameters of a plurality of first coordinate points a1 to a4 and a plurality of second coordinate parameters of a plurality of second coordinate points b1 to b4 corresponding to the coordinate points of the grayscale values respectively in the first fingerprint image 510 and the second fingerprint image 520. The microcontroller 132 may identify close grayscale values in the first fingerprint image 510 and the second fingerprint image 520, using the optical flow method for example, to infer the movement speed, direction, and trajectory of objects in the images by detecting the change in the intensity (pixel value or grayscale value) of image pixel points with time. It is worth noting that a plurality of first grayscale values and a plurality of second grayscale values corresponding to the coordinate points respectively in the first fingerprint image 510 and the second fingerprint image 520 are in a proportional relationship. For example, the relationship between first grayscale values g1 to g4 of the first coordinate points a1 to a4 in the first fingerprint image 510 and second grayscale values h1 to h4 of the second coordinate points b1 to b4 in the second fingerprint image 520 may be as shown by Formula (1) below, where i is a positive integer, and m is a weight value greater than 0.

$$g_i = m \times h_i \qquad \text{Formula (1)}$$

In step S410, the microcontroller 132 may calculate an angle parameter ($\theta_i$) according to the first coordinate parameters and the second coordinate parameters. For example, the angle parameter ($\theta_i$) may be obtained as shown by Formula (2) and Formula (3) below. The first coordinate parameters are (xi, yi), and the second coordinate parameters are (xi', yi'). It is worth noting that, in an embodiment, the microcontroller 132 may be used for the following gesture operations according to the coordinate parameters corresponding to the same rotation angle having the maximum number of occurrences.

$$\theta_i = \tan^{-1}((yi' - yi)/(xi' - xi)) \qquad \text{Formula (2)}$$

$$\theta_1 \cong \theta_2 \ldots \cong \theta_i \qquad \text{Formula (3)}$$

In step S420, the microcontroller 132 may output the angle parameter ($\theta_i$) to the application module 140. The application module 140 may perform a rotation gesture operation according to the angle parameter ($\theta_i$). In step S430, the application module 140 may determine whether a numerical range (range of exposure value) between the first fingerprint image 510 and the second fingerprint image 520 is less than or equal to a predetermined threshold, where the predetermined threshold may be, for example, 200 (digital value). In this regard, since the finger of the user is placed on the sensing region of the panel 110 corresponding to the fingerprint sensor 120 for in-situ rotation (single-point continuous pressing), the change between values (exposure value) output by the analog-to-digital converter corresponding to the first fingerprint image 510 and the second fingerprint image 520 is relatively small, which is in a range between 340 and 450, for example. In this regard, the difference between the average digital values respectively of the first fingerprint image 510 and the second fingerprint image 520 output by the analog-to-digital converter is 100, for example, and is thus less than the predetermined threshold of 200 (100<200). According to the embodiment of FIG. 5A and FIG. 5B, the application module 140 may determine that the numerical range between the first fingerprint image 510 and the second fingerprint image 520 is less than the predetermined threshold. In step S440, the application module 140 may perform an in-situ rotation gesture operation according to the angle parameter, for example, to rotate an icon angle of an icon in a display interface. Therefore, with the process flows and the gesture recognition system 100 of this embodiment, the in-situ rotation gesture of the user can be effectively recognized.

Then, with reference to FIG. 1 to FIG. 4 and FIG. 6, in another embodiment, the microcontroller 132 may obtain a first fingerprint image 610 and a second fingerprint image 620 as shown in FIG. 6. The first fingerprint image 610 and the second fingerprint image 620 respectively have different positions and angles in the overall sensing image obtained by the fingerprint sensor 120. In this embodiment, the microcontroller 132 may respectively select a plurality of coordinate points having a plurality of grayscale values within a grayscale value range in the first fingerprint image 610 and the second fingerprint image 620, to obtain, for example, a plurality of first coordinate parameters of a plurality of first coordinate points c1 to c4 and a plurality of second coordinate parameters of a plurality of second coordinate points d1 to d4 corresponding to the coordinate points respectively in the first fingerprint image 610 and the second fingerprint image 620. It is worth noting that, a plurality of first grayscale values and a plurality of second grayscale values corresponding to the coordinate points respectively in the first fingerprint image 610 and the second fingerprint image 620 are in a proportional relationship (e.g., satisfying Formula (1) above).

In step S410, the microcontroller 132 may also calculate the angle parameter ($\theta_i$) according to the first coordinate parameters and the second coordinate parameters as shown by the relational expressions of Formula (2) and Formula (3) above. In step S420, the microcontroller 132 may output the angle parameter ($\theta_i$) to the application module 140. The application module 140 may perform the rotation gesture operation according to the angle parameter ($\theta_i$). In step S430, the application module 140 may determine whether a numerical range between the first fingerprint image 610 and the second fingerprint image 620 is less than or equal to the predetermined threshold. In this regard, since the finger of the user is placed on the sensing region of the fingerprint sensor 120 for sliding rotation (during the process of which the finger is slightly departed from the fingerprint sensor), the change between values output by the analog-to-digital converter corresponding to the first fingerprint image 610 and the second fingerprint image 620 is relatively great, which is in a range between 300 and 1000, for example. In this regard, the difference between the average digital values respectively of the first fingerprint image 610 and the second fingerprint image 620 output by the analog-to-digital converter is 700, for example, and is thus greater than the predetermined threshold of 200 (700>200). In this regard, in step S450, the application module 140 may perform a sliding rotation gesture operation according to the angle parameter, for example, to rotate the display screen of the electronic device by 90 degrees. Therefore, with the process flows and the gesture recognition system 100 of this embodiment, the sliding rotation gesture of the user can be effectively recognized.

However, the in-situ rotation gesture operation and the sliding rotation gesture operation are not required to be limited to the determination of the numerical range (range of exposure value) of the fingerprint image performed in step S430. In other embodiments of the invention, depending on the current use scenario, the application module 140 only sequentially performs steps S410, S420, and S440 (without performing step S430) to realize the in-situ rotation gesture operation according to the angle parameter, or the application module 140 may only sequentially perform steps S410, S420, and S450 (without performing step S430) to realize the sliding rotation gesture operation according to the angle parameter.

Figure 7:
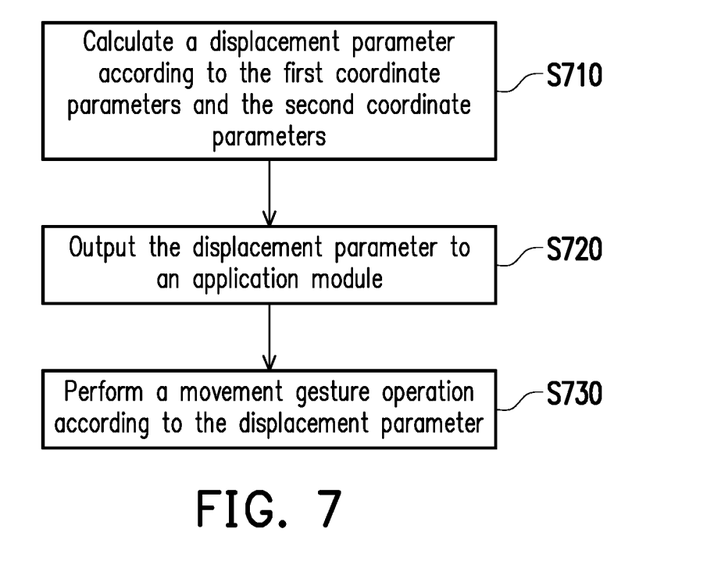
FIG. 7 is a flowchart of recognizing a movement gesture of an embodiment of the invention.
Figure 8:
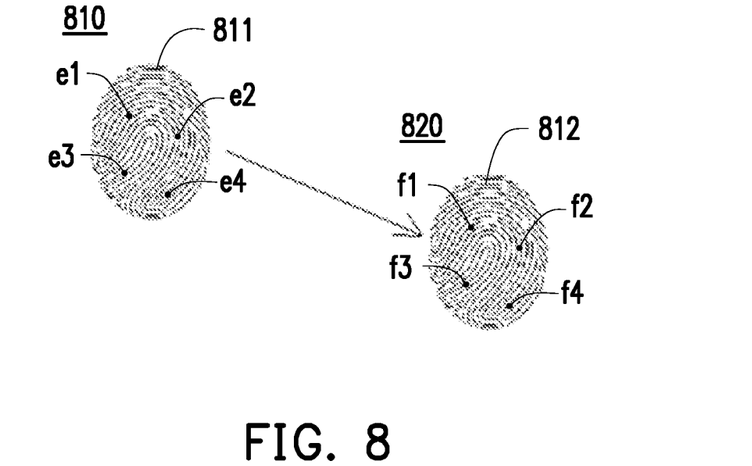
FIG. 8 is a schematic diagram of fingerprint images of a movement gesture of an embodiment of the invention.

FIG. 7 is a flowchart of recognizing a movement gesture of an embodiment of the invention. FIG. 8 is a schematic diagram of fingerprint images of a movement gesture of an embodiment of the invention. In this embodiment, the microcontroller 132 may further perform steps S710 to S730 of FIG. 7 to realize the function of recognizing the movement gesture. Steps S710 to S730 may be further implementation means of step S350 of FIG. 3. With reference to FIG. 1 to FIG. 3, FIG. 7, and FIG. 8, in this embodiment, the microcontroller 132 may obtain a first fingerprint image 810 and a second fingerprint image 820 as shown in FIG. 8. The first fingerprint image 810 and the second fingerprint image 820 respectively have different positions in the overall sensing image obtained by the fingerprint sensor 120.

In this embodiment, the microcontroller 132 may respectively select a plurality of coordinate points having a plurality of grayscale values within a grayscale value range in the first fingerprint image 810 and the second fingerprint image 820, to obtain, for example, a plurality of first coordinate parameters of a plurality of first coordinate points e1 to e4 and a plurality of second coordinate parameters of a plurality of second coordinate points f1 to f4 corresponding to the coordinate points of the grayscale values respectively in the first fingerprint image 810 and the second fingerprint image 820. It is worth noting that a plurality of first grayscale values and a plurality of second grayscale values corresponding to the coordinate points respectively in the first fingerprint image 810 and the second fingerprint image 820 are in a proportional relationship (e.g., satisfying Formula (1) above).

In step S710, the microcontroller 132 may calculate a displacement parameter ($\Delta x_i$ and/or $\Delta y_i$) according to the first coordinate parameters and the second coordinate parameters. For example, the displacement parameter ($\Delta x_i$ and/or $\Delta y_i$) may be obtained as shown by Formula (4) and Formula (5) and/or Formula (6) and Formula (7) below. The first coordinate parameters are (xi, yi), and the second coordinate parameters are (xi', yi'). It is worth noting that, in an embodiment, the microcontroller 132 may be used for the following gesture operation according to the coordinate parameters corresponding to the same displacement having the maximum number of occurrences.

$$\Delta x_i = (x_i' - x_i) \quad \text{Formula (4)}$$

$$\Delta x_1 \cong \Delta x_2 \ldots \cong \Delta x_i \quad \text{Formula (5)}$$

$$\Delta y_i = (y_i' - y_i) \quad \text{Formula (6)}$$

$$\Delta y_1 \cong \Delta y_2 \ldots \cong \Delta y_i \quad \text{Formula (7)}$$

In step S720, the microcontroller 132 may output the displacement parameter ($\Delta x_i$ and/or $\Delta y_i$) to the application module 140. In step S730, the application module 140 may determine a displacement distance and position according to the displacement parameter ($\Delta x_i$ and/or $\Delta y_i$), and perform a movement gesture operation. For example, the application module 140 may determine a displacement distance of a display icon in a display interface, for example, the displacement distance in the display interface in the X direction or the Y direction according to the displacement parameter ($\Delta x_i$ and/or $\Delta y_i$), to move an icon position of the icon displayed in the display interface. Therefore, with the process flows and the gesture recognition system 100 of this embodiment, the movement gesture of the user can be effectively recognized.

Figure 9:
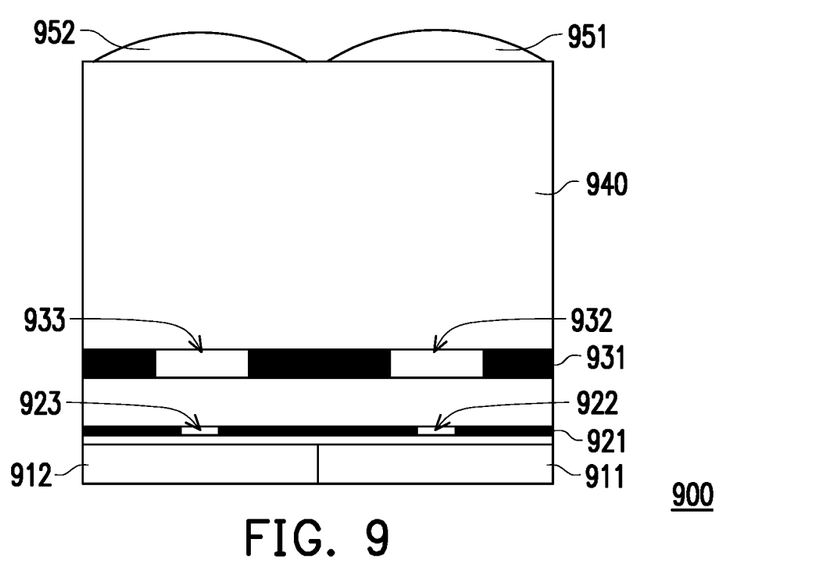
FIG. 9 is a schematic diagram of a structure of a fingerprint sensor of an embodiment of the invention.

FIG. 9 is a schematic diagram of a structure of a fingerprint sensor of an embodiment of the invention. With reference to FIG. 1 and FIG. 9, if the fingerprint sensor 120 of FIG. 1 is a full-screen fingerprint sensor, the fingerprint sensor 120 may include a plurality of thin film transistor image sensing units. In this embodiment, the fingerprint sensor 120 may include a plurality of microlens structures formed on the thin film transistor image sensing units. FIG. 9 shows part of the structure of the fingerprint sensor 120. As shown in a structure 900 of FIG. 9, thin film transistor image sensing units 911 and 912 of the fingerprint sensor 120 are disposed in the bottom layer, and a first light blocking layer 921 may be formed above the thin film transistor image sensing units 911 and 912. Openings 922 and 923 of the first light blocking layer 921 correspond to the thin film transistor image sensing units 911 and 912 in the light sensing direction. A second light blocking layer 931 may be further formed at a position in a distance of a certain height above the first light blocking layer 921. Openings 932 and 933 of the second light blocking layer 931 correspond to the openings 922 and 923 in the light sensing direction. The opening areas of the openings 932 and 933 are greater than those of the openings 932 and 933, and the opening center axes of the openings 932 and 933 overlap the opening center axes of the openings 932 and 933 (or described as having the same opening center axes overlap).

A transparent material layer may be between the first light blocking layer 921 and the second light blocking layer 931. Next, a transparent material layer 940 is formed above the second light blocking layer 931, and microlens structures 951 and 952 are formed above the transparent material layer 940. The microlens structures 951 and 952 are corresponding to the thin film transistor image sensing units 911 and 912 in the light sensing direction to converge the sensing light to the thin film transistor image sensing units 911 and 912 through the openings 922, 923, 932, and 933. Besides, in this embodiment, the overall height of the structure 900 is less than 200 micrometers.

Figure 10:
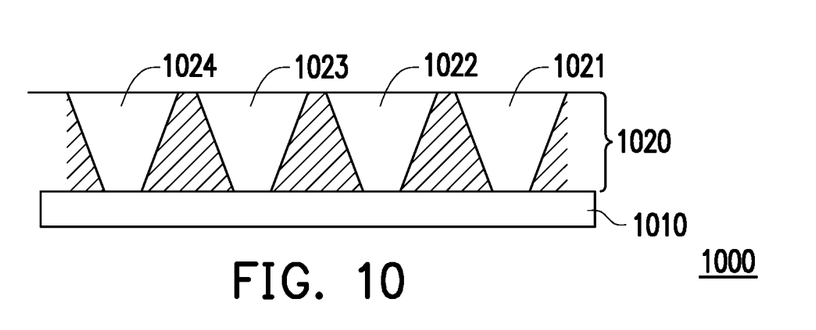
FIG. 10 is a schematic diagram of a structure of a fingerprint sensor of another embodiment of the invention.

FIG. 10 is a schematic diagram of a structure of a fingerprint sensor of another embodiment of the invention. With reference to FIG. 1 and FIG. 10, if the fingerprint sensor 120 of FIG. 1 is a full-screen fingerprint sensor, the fingerprint sensor 120 may include a plurality of thin film transistor image sensing units. In this embodiment, the fingerprint sensor 120 may include a plurality of square cone-shaped holes formed on the thin film transistor image sensing units. FIG. 10 shows part of the structure of the fingerprint sensor 120. As shown in a structure 1000 of FIG. 10, a thin film transistor image sensing unit array 1010 of the fingerprint sensor 120 is disposed in the bottom layer, and a light guide layer 1020 may be formed above the thin film transistor image sensing unit array 1010. The light guide layer 1020 includes a plurality of square cone-shaped holes 1021 to 1024. The square cone-shaped holes 1021 to 1024 of the light guide layer 1020 are surrounded by a black material or a light absorbing material (the region with slant lines). Therefore, the square cone shaped holes 1021 to 1024 may guide the sensing light to the sensing units corresponding to the thin film transistor image sensing unit array in the light sensing direction through the square cone shaped holes 1021 to 1024. Besides, in this embodiment, the overall height of the structure 1000 is less than 200 micrometers.

In summary of the foregoing, in the gesture recognition system and the gesture recognition method of the invention, the touch function, such as recognizing the in-situ rotation gesture, the sliding rotation gesture, and the movement gesture of the user, of the touch panel may be realized through the fingerprint sensor. In other words, in some implementation scenarios, the fingerprint sensor utilized in the gesture recognition system and the gesture recognition method of the invention may be used as substitute for the touch panel of the device itself, reducing the cost and volume of the device. Alternatively, in other implementation scenarios, in the gesture recognition system and the gesture recognition method of the invention, combined with the existing touch system, additional touch functions or touch means that may be additionally used for special conditions of use, for example, a touch gesture that needs to pass the fingerprint recognition being demanded to be obtained by the device, may be provided.

Finally, it should be noted that the above embodiments are merely used for illustrating, instead of limiting, the technical solutions of the invention. Although the invention has been described in detail with reference to the above embodiments, those of ordinary skill in the field should understand that they may still modify the technical solutions recited in the above embodiments or equivalently replace some or all of the technical features thereof. Nonetheless, the nature of the corresponding technical solutions with such modifications or replacements does not depart from the scope of the technical solutions of the embodiments of the invention.

What is claimed is:

1. A gesture recognition system, comprising:
a fingerprint sensor; and
a processing circuit, coupled to the fingerprint sensor, for obtaining a first fingerprint image and a second fingerprint image through the fingerprint sensor, and obtaining a plurality of first coordinate parameters of a plurality of first coordinate points in the first fingerprint image, and obtaining a plurality of second coordinate parameters of a plurality of second coordinate points in the second fingerprint image,
wherein the first coordinate points of the first fingerprint image and the second coordinate points of the second fingerprint image respectively have a plurality of grayscale values corresponding to each other,
wherein the processing circuit determines a gesture operation according to the first coordinate parameters and the second coordinate parameters.

2. The gesture recognition system according to claim 1, wherein the first fingerprint image passes a fingerprint verification, or both of the first fingerprint image and the second fingerprint image pass the fingerprint verification.

3. The gesture recognition system according to claim 1, wherein the processing circuit respectively selects a plurality of coordinate points in the first fingerprint image and the second fingerprint image according to a grayscale value range, and obtains the first coordinate parameters and the second coordinate parameters respectively in the first fingerprint image and the second fingerprint image.

4. The gesture recognition system according to claim 3, wherein a plurality of first grayscale values and a plurality of second grayscale values respectively corresponding to the coordinate points in the first fingerprint image and the second fingerprint image are in a proportional relationship.

5. The gesture recognition system according to claim 1, wherein the processing circuit calculates an angle parameter or a displacement parameter according to the first coordinate parameters and the second coordinate parameters, and an application module performs the gesture operation according to the angle parameter or the displacement parameter.

6. The gesture recognition system according to claim 5, wherein the application module compares a numerical range between the first fingerprint image and the second fingerprint image according to a predetermined threshold to determine whether the gesture operation that is performed is an in-situ rotation gesture operation or a sliding rotation gesture operation.

7. The gesture recognition system according to claim 6, wherein the numerical range is an exposure value difference between the first fingerprint image and the second fingerprint image.

8. The gesture recognition system according to claim 1, wherein the fingerprint sensor is a full-screen fingerprint sensor, and the fingerprint sensor comprises a plurality of thin film transistor image sensing units.

9. A gesture recognition method, comprising:
obtaining a first fingerprint image and a second fingerprint image,
obtaining a plurality of first coordinate parameters of a plurality of first coordinate points in the first fingerprint image, and obtaining a plurality of second coordinate parameters of a plurality of second coordinate points in the second fingerprint image, and
determining a gesture operation according to the first coordinate parameters and the second coordinate parameters,
wherein the first coordinate points of the first fingerprint image and the second coordinate points of the second fingerprint image respectively have a plurality of grayscale values corresponding to each other.

10. The gesture recognition method according to claim 9, wherein the first fingerprint image passes a fingerprint verification, or both of the first fingerprint image and the second fingerprint image pass the fingerprint verification.

11. The gesture recognition method according to claim 9, wherein the step of obtaining the first coordinate parameters and the second coordinate parameters comprises:
respectively selecting a plurality of coordinate points in the first fingerprint image and the second fingerprint image according to a grayscale value range, and obtaining the first coordinate parameters and the second coordinate parameters respectively in the first fingerprint image and the second fingerprint image.

12. The gesture recognition method according to claim 11, wherein a plurality of first grayscale values and a plurality of second grayscale values respectively corresponding to the coordinate points in the first fingerprint image and the second fingerprint image are in a proportional relationship.

13. The gesture recognition method according to claim 9, further comprising:
calculating an angle parameter or a displacement parameter according to the first coordinate parameters and the second coordinate parameters, and
performing the gesture operation by an application module according to the angle parameter or the displacement parameter.

* * * * *